(12) United States Patent
Bonanno et al.

(10) Patent No.: US 9,146,739 B2
(45) Date of Patent: Sep. 29, 2015

(54) BRANCH PREDICTION PRELOADING

(75) Inventors: James J. Bonanno, Wappingers Falls, NY (US); Marcel Mitran, Markham, CA (US); Brian R. Prasky, Wappingers Falls, NY (US); Joran Siu, Thornhill, CA (US); Timothy J. Slegel, Staatsburg, NY (US); Alexander Vasilevskiy, Brampton, CA (US)

(73) Assignee: International Business Machines Corporation, Armonk, NY (US)

( * ) Notice: Subject to any disclaimer, the term of this patent is extended or adjusted under 35 U.S.C. 154(b) by 662 days.

(21) Appl. No.: 13/517,779

(22) Filed: Jun. 14, 2012

(65) Prior Publication Data

US 2013/0339691 A1 Dec. 19, 2013

(51) Int. Cl.
*G06F 9/30* (2006.01)
*G06F 9/38* (2006.01)

(52) U.S. Cl.
CPC .......... *G06F 9/30058* (2013.01); *G06F 9/3806* (2013.01); *G06F 9/3844* (2013.01)

(58) Field of Classification Search
None
See application file for complete search history.

(56) References Cited

U.S. PATENT DOCUMENTS

| | | | | |
|---|---|---|---|---|
| 4,679,141 A | * | 7/1987 | Pomerene et al. | 712/240 |
| 5,742,804 A | * | 4/1998 | Yeh et al. | 712/237 |
| 6,073,215 A | * | 6/2000 | Snyder | 711/137 |
| 6,092,188 A | * | 7/2000 | Corwin et al. | 712/239 |
| 6,119,203 A | * | 9/2000 | Snyder et al. | 711/137 |
| 6,223,280 B1 | * | 4/2001 | Horton et al. | 712/240 |
| 6,389,531 B1 | | 5/2002 | Irle et al. | |
| 6,397,326 B1 | * | 5/2002 | Horton et al. | 712/240 |
| 6,477,639 B1 | | 11/2002 | Krishnan et al. | |
| 6,611,910 B2 | * | 8/2003 | Sharangpani et al. | 712/237 |
| 7,398,377 B2 | | 7/2008 | McDonald et al. | |
| 7,493,480 B2 | * | 2/2009 | Emma et al. | 712/240 |
| 7,882,338 B2 | | 2/2011 | Alexander et al. | |
| 7,913,068 B2 | | 3/2011 | Bonanno et al. | |

(Continued)

FOREIGN PATENT DOCUMENTS

WO WO0022516 4/2000

OTHER PUBLICATIONS

International Application No. PCT/EP2013/060328, International Search Report and Written Opinion dated Aug. 13, 2013, 10 pages.

(Continued)

*Primary Examiner* — Corey S Faherty
(74) *Attorney, Agent, or Firm* — Cantor Colburn LLP; William A. Kinnaman, Jr.

(57) ABSTRACT

Embodiments relate to branch prediction preloading. An aspect includes a system for branch prediction preloading. The system includes an instruction cache and branch target buffer (BTB) coupled to a processing circuit, the processing circuit configured to perform a method. The method includes fetching a plurality of instructions in an instruction stream from the instruction cache, and decoding a branch prediction preload instruction in the instruction stream. An address of a predicted branch instruction is determined based on the branch prediction preload instruction. A predicted target address is determined based on the branch prediction preload instruction. A mask field is identified in the branch prediction preload instruction, and a branch instruction length is determined based on the mask field. Based on executing the branch prediction preload instruction, the BTB is preloaded with the address of the predicted branch instruction, the branch instruction length, the branch type, and the predicted target address.

14 Claims, 11 Drawing Sheets

(56) References Cited

U.S. PATENT DOCUMENTS

| | | | |
|---|---|---|---|
| 8,131,976 B2* | 3/2012 | Doing et al. | 712/205 |
| 2005/0132175 A1 | 6/2005 | Henry et al. | |
| 2006/0179277 A1 | 8/2006 | Flachs et al. | |
| 2007/0088915 A1* | 4/2007 | Archambault et al. | 711/137 |
| 2009/0204798 A1 | 8/2009 | Alexander et al. | |
| 2009/0313462 A1* | 12/2009 | Emma et al. | 712/240 |
| 2010/0287358 A1* | 11/2010 | Emma et al. | 712/208 |

OTHER PUBLICATIONS

IBM Synergistic Processor Unit Instruction Set Architecture Version 1.2, Jan. 27, 2007, 140 pages (Part 1); and, 139 pages (Part 2), separated into 2 electronic attachments.

z/Architecture: "Principles of Operation," Ninth Edition, Aug. 2010, Publication No. SA22-7832-08, copyright IBM Corp., 700 pages (Part 1); and, 776 pages (Part 2), separated into 2 electronic attachments.

* cited by examiner

BRANCH PREDICTION PRELOADING

BACKGROUND

The present invention relates generally to computer processing systems, and more specifically, to branch prediction preloading.

An instruction pipeline in a computer processor improves instruction execution throughput by processing instructions using a number of pipeline stages, where multiple stages can act on different instructions of an instruction stream in parallel. A conditional branch instruction in an instruction stream may result in a pipeline stall if the processor waits until the conditional branch instruction is resolved in an execution stage in the pipeline before fetching a next instruction in an instruction fetching stage for the pipeline. A branch predictor may attempt to guess whether a conditional branch will be taken or not. A branch predictor may also include branch target prediction, which attempts to guess a target of a taken conditional or unconditional branch before it is computed by decoding and executing the instruction itself. A branch target may be a computed address based on an offset and/or an indirect reference through a register.

A branch target buffer (BTB) can be used to predict the target of a predicted taken branch instruction based on the address of the branch instruction. Predicting the target of the branch instruction can prevent pipeline stalls by not waiting for the branch instruction to reach the execution stage of the pipeline to compute the branch target address. By performing branch target prediction, the branch's target instruction decode may be performed in the same cycle or the cycle after the branch instruction instead of having multiple bubble/empty cycles between the branch instruction and the target of the predicted taken branch instruction. Other branch prediction components that may be included in the BTB or implemented separately include a branch history table and a pattern history table. A branch history table can predict the direction of a branch (taken vs. not taken) as a function of the branch address. A pattern history table can assist with direction prediction of a branch as a function of the pattern of branches encountered leading up to the given branch which is to be predicted.

SUMMARY

Embodiments include a system and computer program product for branch prediction preloading. The system for branch prediction preloading includes an instruction cache and a branch target buffer coupled to a processing circuit. The processing circuit is configured to perform a method. The method includes fetching a plurality of instructions in an instruction stream from the instruction cache, and decoding a branch prediction preload instruction in the instruction stream. The method further includes determining, by the processing circuit, an address of a predicted branch instruction based on the branch prediction preload instruction, and determining, by the processing circuit, a predicted target address of the predicted branch instruction based on the branch prediction preload instruction. The method also includes identifying a mask field in the branch prediction preload instruction, and determining, by the processing circuit, a branch instruction length of the predicted branch instruction based on the mask field. Based on executing the branch prediction preload instruction, the branch target buffer is preloaded with the address of the predicted branch instruction, the branch instruction length, and the predicted target address associated with the predicted branch instruction.

The computer program product includes a tangible storage medium readable by a processing circuit and storing instructions for execution by the processing circuit for performing a method. The method includes fetching a plurality of instructions in an instruction stream, and decoding a branch prediction preload instruction in the instruction stream. The method also includes determining, by the processing circuit, an address of a predicted branch instruction based on the branch prediction preload instruction, and determining, by the processing circuit, a predicted target address of the predicted branch instruction based on the branch prediction preload instruction. The method further includes identifying a mask field in the branch prediction preload instruction, and determining, by the processing circuit, a branch instruction length of the predicted branch instruction based on the mask field. Based on executing the branch prediction preload instruction, a branch target buffer is preloaded with the address of the predicted branch instruction, the branch instruction length, and the predicted target address associated with the predicted branch instruction.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

An exemplary embodiment enables branch prediction preloading. Branch prediction is typically learned over time as code repeatedly executes and surprise branches, those branches only learned about through the process of decoding, are installed in a branch target buffer (BTB). Once the BTB is populated with entries indicating branch address, target address, and direction information, e.g., taken vs. not taken, prediction accuracy increases as updates to the BTB are made after branch predictions are resolved. Exemplary embodiments provide branch prediction preloading using branch prediction preloading instructions such that branch instruction addresses and target addresses can be inserted into the BTB before the associated branch is taken. When writing software or compiling software, code can be analyzed to look for branch instructions. Branch prediction preload instructions can be added to the code ahead of the branches such that subsequent branches may be accurately predicted and surprise branches avoided. Avoiding surprise branches reduces pipeline stalls that can otherwise occur while waiting for a surprise branch to be resolved. A BTB populated using branch prediction preload instructions may be physically reduced in size while maintaining substantially similar performance as the accuracy and hit rate of the contents of the non-preloaded originally sized BTB. For example, the BTB size may be reduced by a 4:1 ratio using branch prediction preload instructions over a BTB that does not support branch prediction preload instructions.

Figure 1A:
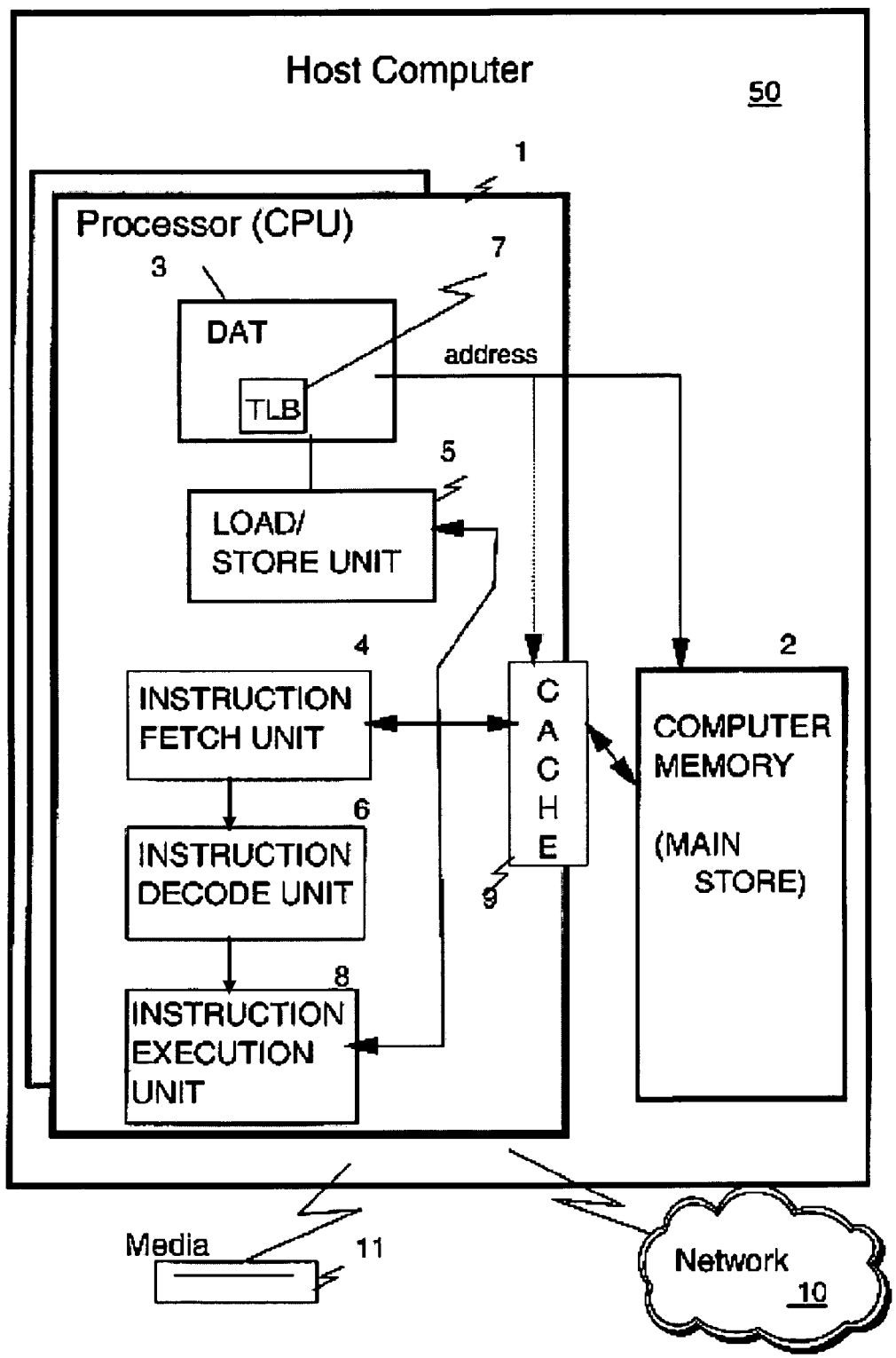
FIG. 1A is a diagram depicting an example host computer system in an embodiment.

FIG. 1A, depicts the representative components of a host computer system 50 in an embodiment. Other arrangements of components may also be employed in a computer system. The representative host computer system 50 comprises one or more processors 1 in communication with main store (computer memory) 2 as well as I/O interfaces to storage devices 11 and networks 10 for communicating with other computers or storage area networks (SANs) and the like. The processor 1 is compliant with an architecture having an architected instruction set and architected functionality. The processor 1 may have dynamic address translation (DAT) 3 for transforming program addresses (virtual addresses) into a real address in memory. A DAT 3 typically includes a translation lookaside buffer (TLB) 7 for caching translations so that later accesses to the block of computer memory 2 do not require the delay of address translation. Typically a cache 9 is employed between the computer memory 2 and the processor 1. The cache 9 may be hierarchical having a large cache available to more than one CPU and smaller, faster (lower level) caches between the large cache and each CPU. In some embodiments, the lower level caches are split to provide separate low level caches for instruction fetching and data accesses. In an embodiment, an instruction is fetched from the computer memory 2 by an instruction fetch unit 4 via the cache 9. The instruction is decoded in an instruction decode unit 6 and dispatched (with other instructions in some embodiments) to instruction execution units 8. Typically several instruction execution units 8 are employed, for example an arithmetic execution unit, a floating point execution unit and a branch instruction execution unit. The instruction is executed by the instruction execution unit 8, accessing operands from instruction specified registers or the computer memory 2 as needed. If an operand is to be accessed (loaded or stored) from the computer memory 2, the load store unit 5 typically handles the access under control of the instruction being executed. Instructions may be executed in hardware circuits or in internal microcode (firmware) or by a combination of both.

Figure 1B:
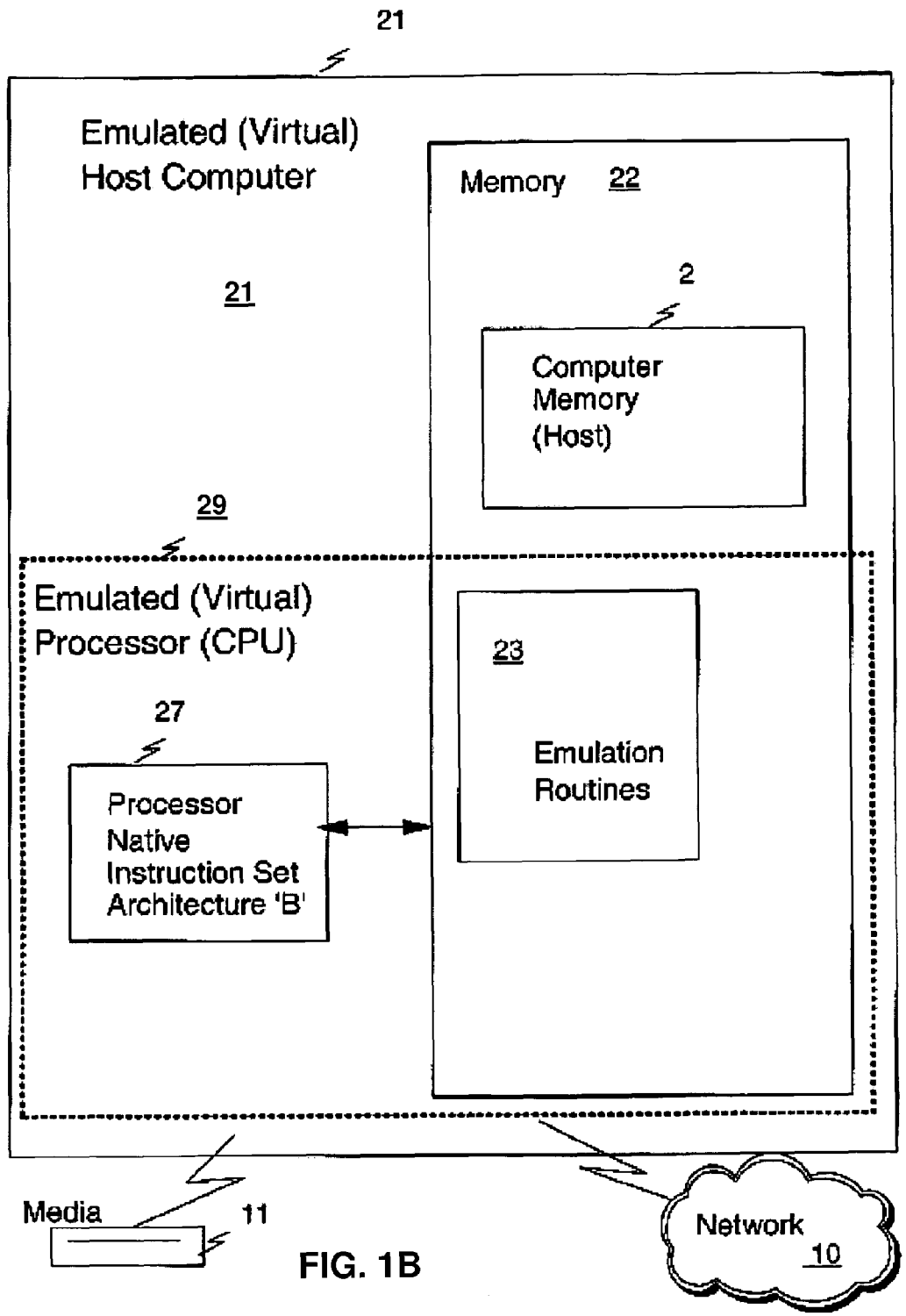
FIG. 1B is a diagram depicting an example emulation host computer system in an embodiment.

In FIG. 1B, depicts an emulated host computer system 21 is provided that emulates a host computer system of a host architecture, such as the host computer system 50 of FIG. 1. In the emulated host computer system 21, a host processor (CPU) 1 is an emulated host processor (or virtual host processor) 29, and comprises a native processor 27 having a different native instruction set architecture than that of the processor 1 of the host computer system 50. The emulated host computer system 21 has memory 22 accessible to the native processor 27. In an embodiment, the memory 22 is partitioned into a computer memory 2 portion and an emulation routines memory 23 portion. The computer memory 2 is available to programs of the emulated host computer system 21 according to the host computer architecture. The native processor 27 executes native instructions of an architected instruction set of an architecture other than that of the emulated processor 29, the native instructions obtained from the emulation routines memory 23, and may access a host instruction for execution from a program in the computer memory 2 by employing one or more instruction(s) obtained in a sequence & access/decode routine which may decode the host instruction(s) accessed to determine a native instruction execution routine for emulating the function of the host instruction accessed. Other facilities that are defined for the host computer system 50 architecture may be emulated by architected facilities routines, including such facilities as general purpose registers, control registers, dynamic address translation and input/output (I/O) subsystem support and processor cache for example. The emulation routines may also take advantage of function available in the native processor 27 (such as general registers and dynamic translation of virtual addresses) to improve performance of the emulation routines. Special hardware and off-load engines may also be provided to assist the native processor 27 in emulating the function of the host computer system 50.

In a mainframe, architected machine instructions are used by programmers, for example by programmers often by way of a just-in-time compiler application. These instructions stored in the storage medium may be executed natively in a z/Architecture IBM Server, or alternatively in machines executing other architectures. They can be emulated in the existing and in future IBM mainframe servers and on other machines of IBM (e.g. pSeries® Servers and xSeries® Servers). They can be executed in machines running Linux on a wide variety of machines using hardware manufactured by IBM®, Intel®, AMD™, Oracle and others. Besides execution on that hardware under a Z/Architecture®, Linux can be used as well as machines which use emulation by Hercules, UMX, Fundamental Software, Inc. (FSI) or Platform Solutions, Inc. (PSI), where generally execution is in an emulation mode. In emulation mode, emulation software is executed by a native processor to emulate the architecture of an emulated processor.

One or more of the components of the emulated host computer system 21 are further described in "IBM® z/Architecture Principles of Operation," Publication No. SA22-7832-08, 9th Edition, August, 2010 which is hereby incorporated herein by reference in its entirety. IBM is a registered trademark of International Business Machines Corporation, Armonk, N.Y., USA. Other names used herein may be registered trademarks, trademarks or product names of International Business Machines Corporation or other companies.

The native processor 27 typically executes emulation software stored in the emulation routines memory 23 comprising either firmware or a native operating system to perform emulation of the emulated processor. The emulation software is responsible for fetching and executing instructions of the emulated processor architecture. The emulation software maintains an emulated program counter to keep track of instruction boundaries. The emulation software may fetch one or more emulated machine instructions at a time and convert the one or more emulated machine instructions to a corresponding group of native machine instructions for execution by the native processor 27. These converted instructions may be cached such that a faster conversion can be accomplished. The emulation software maintains the architecture rules of the emulated processor architecture so as to assure operating systems and applications written for the emulated processor operate correctly. Furthermore the emulation software provides resources identified by the emulated processor architecture including, but not limited to control registers, general purpose registers, floating point registers, dynamic address translation function including segment tables and page tables for example, interrupt mechanisms, context switch mechanisms, time of day (TOD) clocks and architected interfaces to I/O subsystems such that an operating system or an application program designed to run on the emulated processor 29, can be run on the native processor 27 having the emulation software.

A specific instruction being emulated is decoded, and a subroutine called to perform the function of the individual instruction. An emulation software function emulating a function of an emulated processor 29 is implemented, for example, in a "C" subroutine or driver, or some other method of providing a driver for the specific hardware as will be within the skill of those in the art after understanding the description of the preferred embodiment.

An embodiment may be practiced by software (sometimes referred to licensed internal code, firmware, micro-code, milli-code, pico-code and the like, any of which would be consistent with embodiments). Referring to FIG. 1A, software program code is accessed by the processor also known as a CPU (Central Processing Unit) 1 of the host computer system 50 from the storage device 11 such as a long-term storage media, a CD-ROM drive, tape drive or hard drive. The software program code may be embodied on any of a variety of known media for use with a data processing system, such as a diskette, hard drive, CD-ROM, Blu-ray disc, or universal serial bus (USB) flash drives. The code may be distributed on such media, or may be distributed to users from the computer memory 2 or storage of one computer system over a network 10 to other computer systems for use by users of such other systems.

Alternatively, the program code may be embodied in the computer memory 2, and accessed by the processor 1 using a processor bus (not shown). Such program code includes an operating system which controls the function and interaction of the various computer components and one or more application programs. Program code is normally paged from a dense media such as the storage device 11 to computer memory 2 where it is available for processing by the processor 1. The techniques and methods for embodying software program code in memory, on physical media, and/or distributing software code via networks are well known and will not be further discussed herein. Program code, when created and stored on a tangible medium (including but not limited to electronic memory modules (RAM), flash memory, compact discs (CDs), DVDs, Magnetic Tape and the like is often referred to as a "computer program product." The computer program product medium is typically readable by a processing circuit preferably in a computer system for execution by the processing circuit.

Figure 1C:
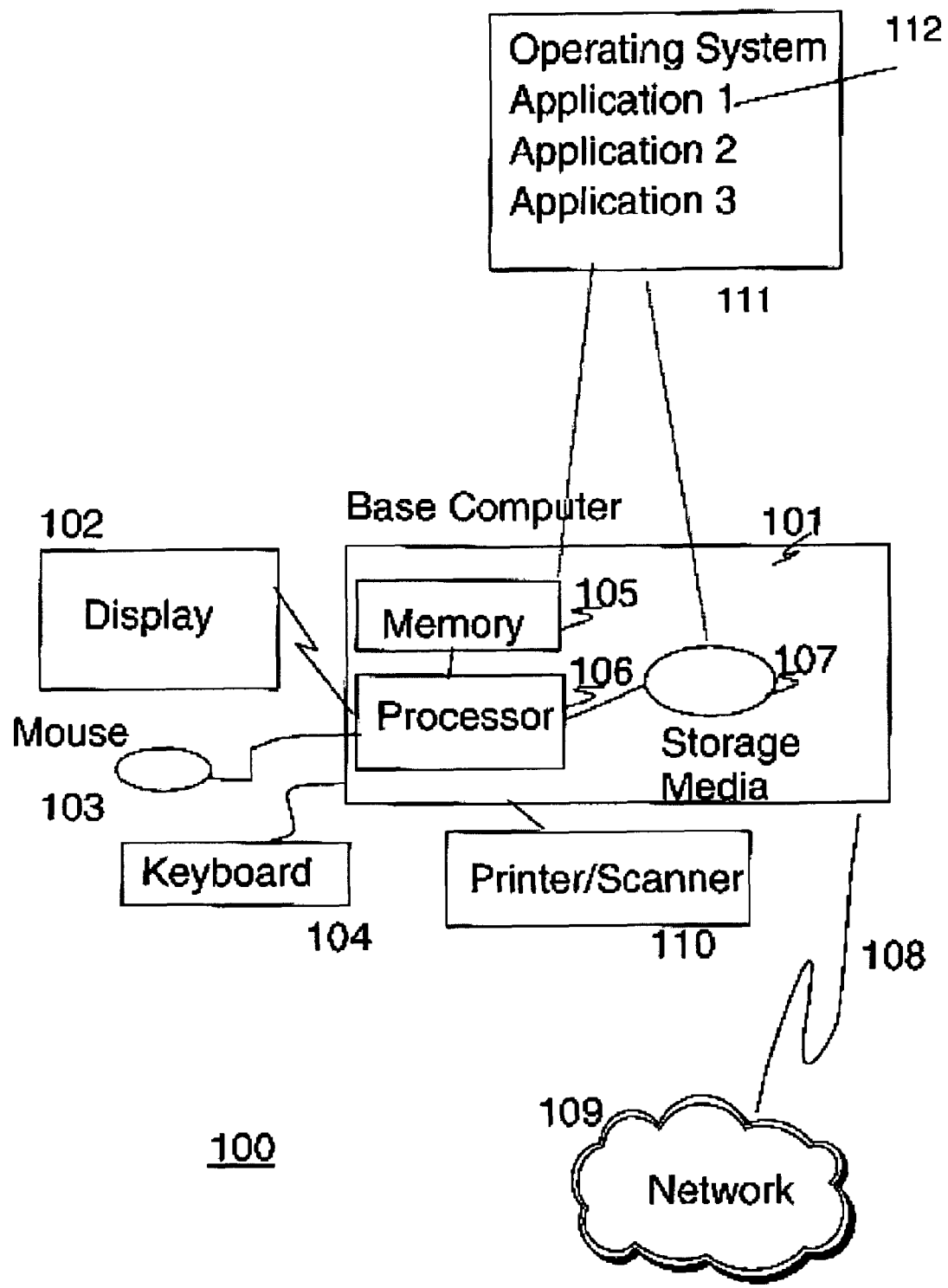
FIG. 1C is a diagram depicting an example computer system in an embodiment.

FIG. 1C illustrates a representative workstation or server hardware system in an exemplary embodiment. The system 100 of FIG. 1C comprises a representative base computer system 101, such as a personal computer, a workstation or a server, including optional peripheral devices. The base computer system 101 includes one or more processors 106 and a bus (not shown) employed to connect and enable communication between the one or more processors 106 and the other components of the base computer system 101 in accordance with known techniques. The bus connects the processor 106 to memory 105 and long-term storage 107 which may include a hard drive (including any of magnetic media, CD, DVD and Flash Memory for example) or a tape drive for example. The base computer system 101 may also include a user interface adapter, which connects the one or more processors 106 via the bus to one or more interface devices, such as a keyboard 104, a mouse 103, a printer/scanner 110 and/or other interface devices, which may be any user interface device, such as a touch sensitive screen, digitized entry pad, etc. The bus also connects the one or more processors to a display device 102, such as an LCD screen or monitor via a display adapter.

The base computer system 101 may communicate with other computers or networks of computers by way of a network adapter capable of communicating 108 with a network 109. Example network adapters are communications channels, token ring, Ethernet or modems. Alternatively, the base computer system 101 may communicate using a wireless interface, such as a cellular digital packet data (CDPD) card. The base computer system 101 may be associated with such other computers in a local area network (LAN) or a wide area network (WAN), or the base computer system 101 may be a client in a client/server arrangement with another computer, etc.

Figure 2:
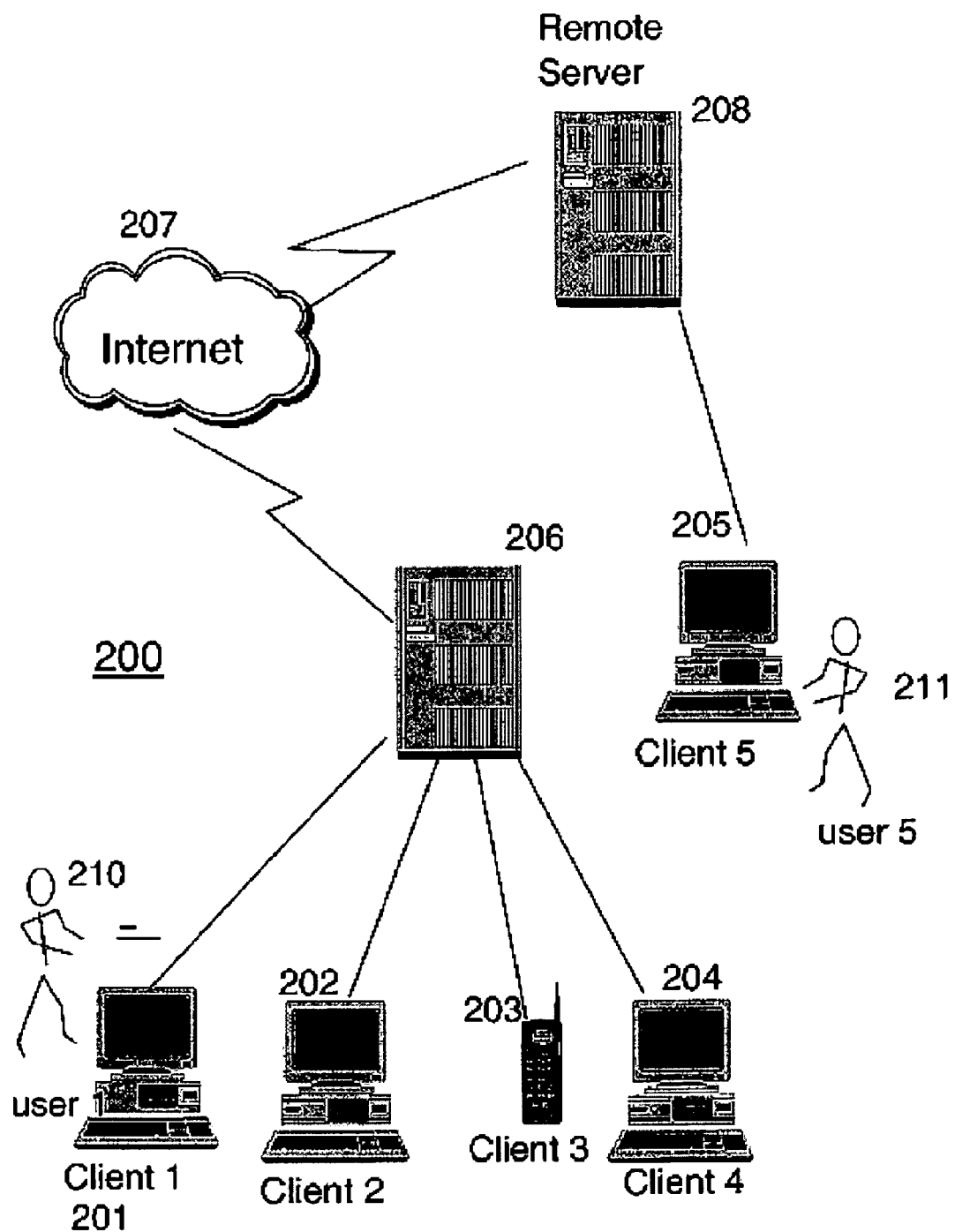
FIG. 2 is a diagram depicting an example computer network in an embodiment.

FIG. 2 illustrates a data processing network 200 in which embodiments may be practiced. The data processing network 200 may include a plurality of individual networks, such as a wireless network and a wired network, each of which may include a plurality of individual workstations 201, 202, 203, 204 and or the base computer system 101 of FIG. 1C. Additionally, as those skilled in the art will appreciate, one or more LANs may be included, where a LAN may comprise a plurality of intelligent workstations coupled to a host processor.

Programming code 111 may be embodied in the memory 105, and accessed by the processor 106 using the processor bus. Such programming code includes an operating system which controls the function and interaction of the various computer components and one or more application programs 112. Program code is normally paged from long-term storage 107 to high-speed memory 105 where it is available for processing by the processor 106. The processor 106 may also be referred to as processing circuit 106. The techniques and methods for embodying software programming code in memory, on physical media, and/or distributing software code via networks are well known and will not be further discussed herein. Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit.

The cache that is most readily available to the processor (normally faster and smaller than other caches of the processor) is the lowest (L1 or level one) cache and main store (main memory) is the highest level cache (L3 if there are 3 levels). The lowest level cache is often divided into an instruction cache (I-Cache) holding machine instructions to be executed and a data cache (D-Cache) holding data operands.

Still referring to FIG. 2, the networks may also include mainframe computers or servers, such as a gateway computer (client server) 206 or application server (remote server) 208 which may access a data repository and may also be accessed directly from a workstation 205. A gateway computer 206 serves as a point of entry into each network 207. A gateway is needed when connecting one networking protocol to another. The gateway computer 206 may be preferably coupled to another network (the Internet 207 for example) by means of a communications link. The gateway computer 206 may also be directly coupled to the one or more workstations 101, 201, 202, 203, and 204 using a communications link. The gateway computer may be implemented utilizing an IBM zEnterprise 196 server available from International Business Machines Corporation.

In an exemplary embodiment, software programming code is accessed by the processor 106 of the base computer system 101 from long-term storage media, such as the long-term storage 107 of FIG. 1C. The software programming code may be embodied on any of a variety of known media for use with a data processing system, such as a diskette, hard drive, or CD-ROM. The code may be distributed on such media, or may be distributed to users 210 and 211 from the memory or storage of one computer system over a network to other computer systems for use by users of such other systems.

Figure 3:
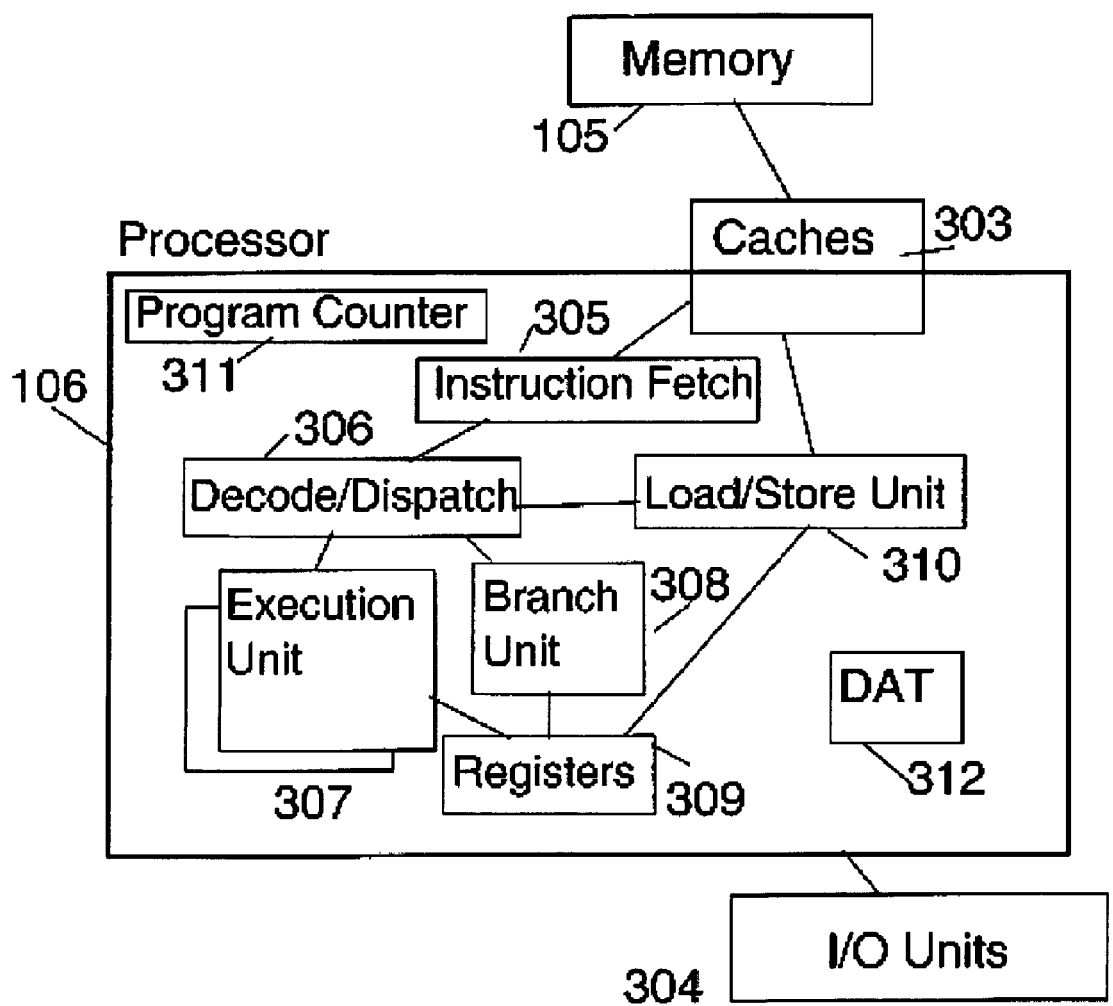
FIG. 3 is a diagram depicting elements of a computer system in an embodiment.

Referring to FIG. 3, an exemplary processor embodiment is depicted for processor 106. One or more levels of cache 303 are employed to buffer memory blocks in order to improve the performance of the processor 106. The cache 303 is a high speed buffer holding cache lines of memory data that are likely to be used. Typical cache lines are 64, 128 or 256 bytes of memory data. In an embodiment, separate caches are employed for caching instructions and for caching data. Cache coherence (synchronization of copies of lines in memory and the caches) is often provided by various "snoop" algorithms well known in the art. Main storage, such as memory 105 of a processor system is often referred to as a cache. In a processor system having 3 levels of cache 303, memory 105 is sometimes referred to as the level 4 (L4) cache since it is typically faster and only holds a portion of the non-volatile storage (DASD, Tape, etc.) that is available to a computer system. Memory 105 "caches" pages of data paged in and out of the memory 105 by the operating system.

A program counter (instruction counter) 311 keeps track of the address of the current instruction to be executed. A program counter in a z/Architecture processor is 64 bits and may be truncated to 31 or 24 bits to support prior addressing limits. A program counter is typically embodied in a program status word (PSW) of a computer such that it persists during context switching. Thus, a program in progress, having a program counter value, may be interrupted by, for example, the operating system (i.e., the current context switches from the program environment to the operating system environment). The PSW of the program maintains the program counter value while the program is not active, and the program counter (in the PSW) of the operating system is used while the operating system is executing. In an embodiment, the program counter is incremented by an amount equal to the number of bytes of the current instruction. Reduced Instruction Set Computing (RISC) instructions are typically fixed length while Complex Instruction Set Computing (CISC) instructions are typically variable length. Instructions of the IBM z/Architecture are CISC instructions having a length of 2, 4 or 6 bytes. The program counter 311 is modified by either a context switch operation or a branch taken operation of a branch instruction for example. In a context switch operation, the current program counter value is saved in the PSW along with other state information about the program being executed (such as condition codes), and a new program counter value is loaded pointing to an instruction of a new program module to be executed. A branch taken operation is performed in order to permit the program to make decisions or loop within the program by loading the result of the branch instruction into the program counter 311.

In an embodiment, an instruction fetch unit 305 is employed to fetch instructions on behalf of the processor 106. The instruction fetch unit 305 either fetches the "next sequential instructions", the target instructions of branch taken instructions, or the first instructions of a program following a context switch. In an embodiment, the instruction fetch unit 305 employs prefetch techniques to speculatively prefetch instructions based on the likelihood that the prefetched instructions might be used. For example, the instruction fetch unit 305 may fetch 16 bytes of instructions that include the next sequential instruction and additional bytes of further sequential instructions.

The fetched instructions are then executed by the processor 106. In an embodiment, the fetched instruction(s) are passed to a decode/dispatch unit 306 of the instruction fetch unit 305. The decode/dispatch unit 306 decodes the instruction(s) and forwards information about the decoded instruction(s) to appropriate units 307, 308, and/or 310. Sequencing between the various units (or stages) 306, 307, 308, 310 may be performed in a pipelined manner to keep the units 306, 307, 308, 310 utilized for greater throughput. An execution unit 307 receives information about decoded arithmetic instructions from the instruction fetch unit 305 and will perform arithmetic operations on operands according to the operation code (opcode) of the instruction. Operands are provided to the execution unit 307 either from the memory 105, architected registers 309, or from an immediate field of the instruction being executed. Results of the execution, when stored, are stored either in memory 105, architected registers 309 or in other machine hardware (such as control registers, PSW registers and the like).

Figure 4A:
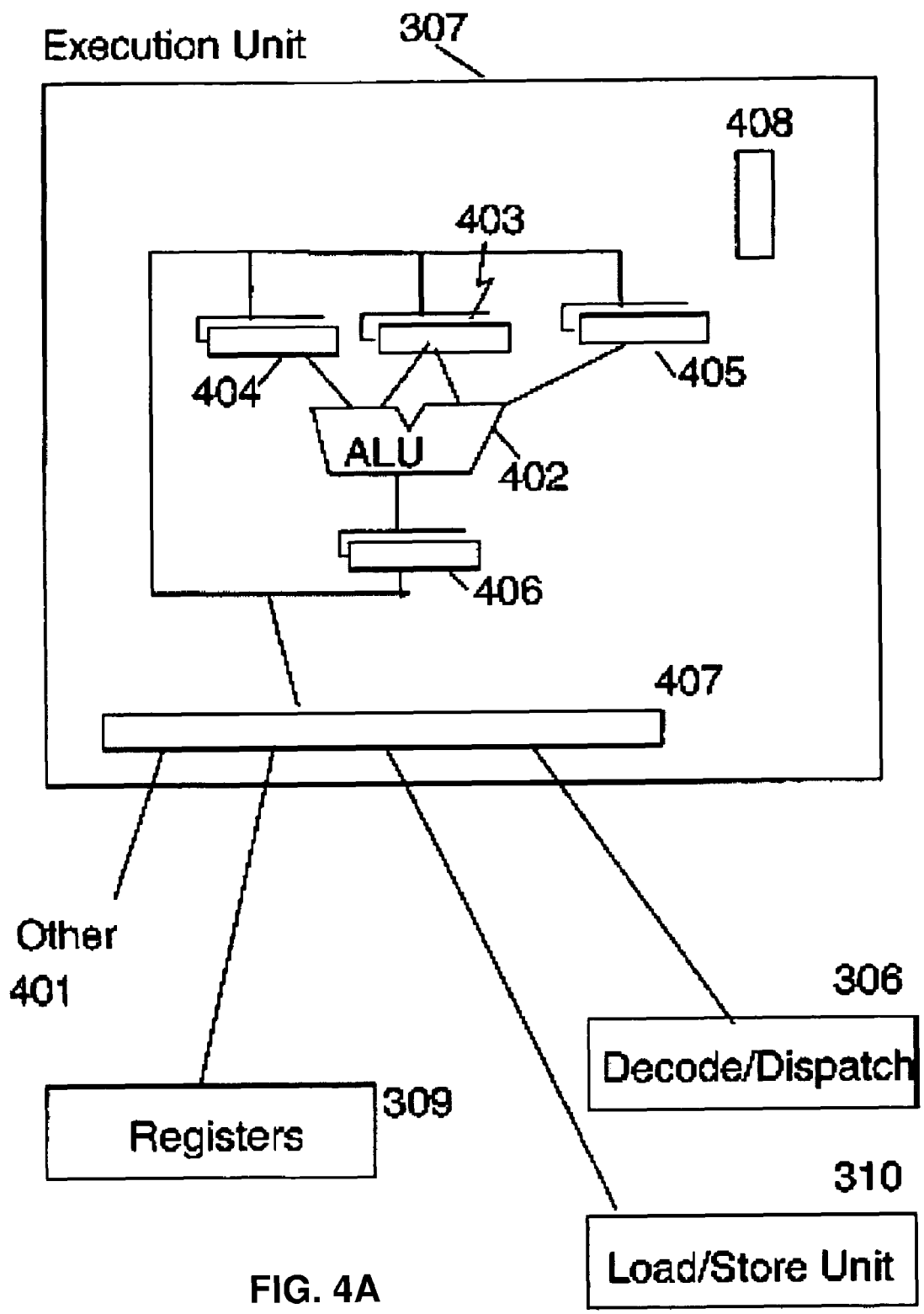
FIGS. 4A-4C depict detailed elements of a computer system in an embodiment.

A processor 106 typically has one or more units 307, 308, and 310 for executing the function of the instruction. Referring to FIG. 4A, an execution unit 307 may communicate with the architected registers 309, the decode/dispatch unit 306, the load/store unit 310 and other processor units 401 by way of interfacing logic 407. The execution unit 307 may employ several register circuits 403, 404, and 405 to hold information that the arithmetic logic unit (ALU) 402 will operate on. The ALU 402 performs arithmetic operations such as add, subtract, multiply and divide as well as logical function such as and, or and exclusive-or (xor), rotate and shift. In an embodiment, the ALU supports specialized operations that are design dependent. Other circuits may provide other architected facilities 408 including condition codes and recovery support logic for example. Typically the result of an ALU operation is held in an output register circuit 406 which can forward the result to a variety of other processing functions. In other embodiments, there are many arrangements of processor units, the present description is only intended to provide a representative understanding of one embodiment.

An ADD instruction for example would be executed in an execution unit 307 having arithmetic and logical functionality while a floating point instruction for example would be executed in a floating point execution unit (not shown) having specialized floating point capability. Preferably, an execution unit operates on operands identified by an instruction by performing an opcode defined function on the operands. For example, an ADD instruction may be executed by an execution unit 307 on operands found in two architected registers 309 identified by register fields of the instruction.

The execution unit 307 performs the arithmetic addition on two operands and stores the result in a third operand where the third operand may be a third register or one of the two source registers. The execution unit 307 preferably utilizes an arithmetic logic unit (ALU) 402 that is capable of performing a variety of logical functions such as shift, rotate, and, or and XOR as well as a variety of algebraic functions including any of add, subtract, multiply, divide. Some ALUs 402 are designed for scalar operations and some for floating point. In embodiments, data may be big endian (where the least significant byte is at the highest byte address) or little endian (where the least significant byte is at the lowest byte address) depending on architecture. The IBM z/Architecture is big endian. Signed fields may be sign and magnitude, 1's complement or 2's complement depending on architecture. A 2's complement number is advantageous in that the ALU does not need to design a subtract capability since either a negative value or a positive value in 2's complement requires only an addition within the ALU. Numbers are commonly described in shorthand, where a 12 bit field defines an address of a 4,096 byte block and is commonly described as a 4 Kbyte (Kilobyte) block for example.

Figure 4B:
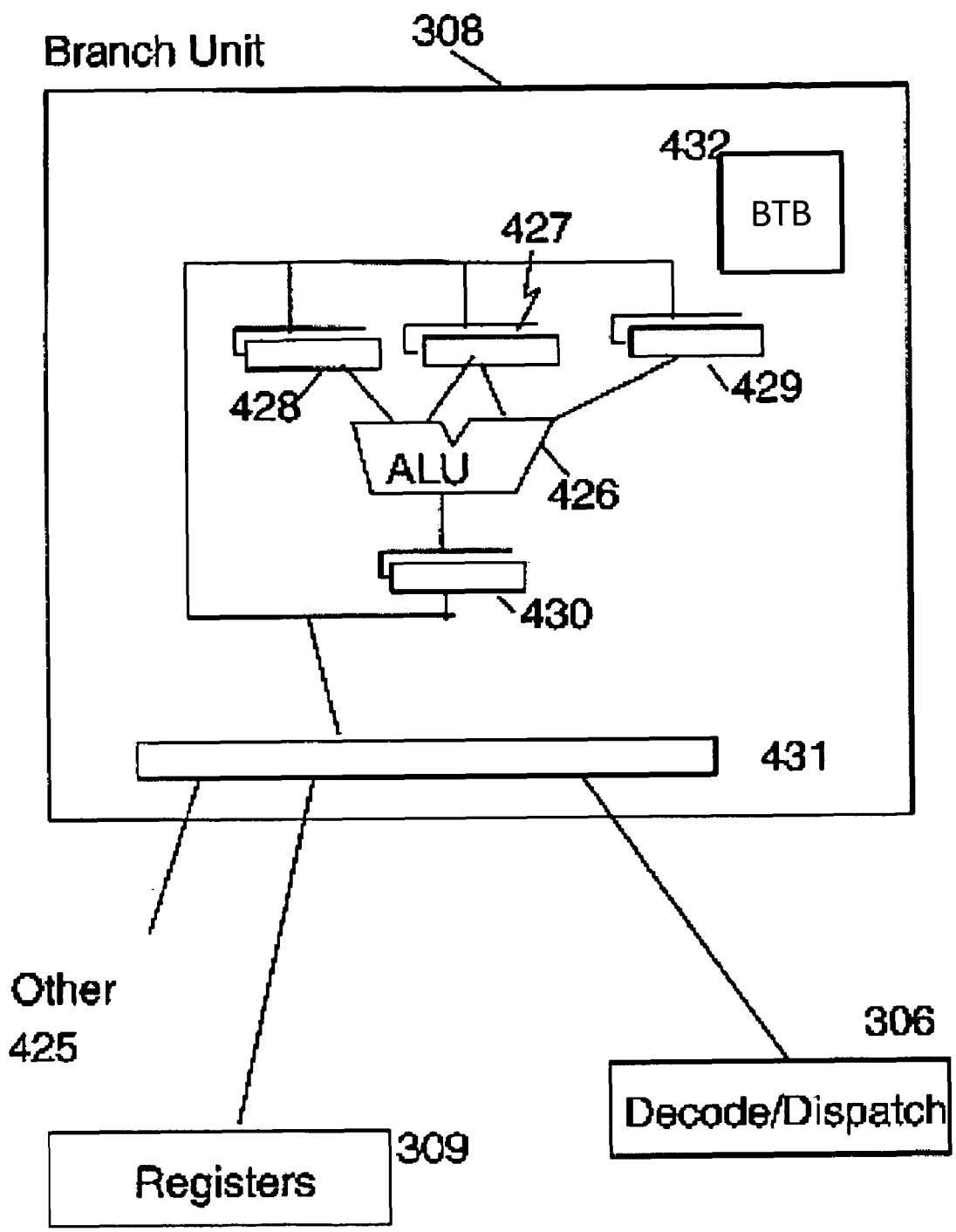

Referring to FIG. 4B, branch instruction information for executing a branch instruction is typically sent to a branch unit 308 which employs branch prediction using a structure such as a branch target buffer (BTB) 432 to predict the outcome of the branch before other conditional operations are complete. The target of the current branch instruction will be fetched and speculatively executed before the conditional operations are complete. When the conditional operations are completed, the speculatively executed branch instructions are either completed or discarded based on the conditions of the conditional operation and the speculated outcome. A typical branch instruction may test condition codes and branch to a target address if the condition codes meet the branch requirement of the branch instruction, a target address may be calculated based on several numbers including ones found in register fields or an immediate field of the instruction for example. In an embodiment, the branch unit 308 may employ an ALU 426 having a plurality of input register circuits 427, 428, and 429 and an output register circuit 430. The branch unit 308 may communicate with general registers, decode/dispatch unit 306 or other circuits 425 for example.

The execution of a group of instructions may be interrupted for a variety of reasons including a context switch initiated by an operating system, a program exception or error causing a context switch, an I/O interruption signal causing a context switch or multi-threading activity of a plurality of programs (in a multi-threaded environment) for example. In an embodiment, a context switch action saves state information about a currently executing program and then loads state information about another program being invoked. State information may be saved in hardware registers or in memory for example. State information includes a program counter value pointing to a next instruction to be executed, condition codes, memory translation information and architected register content. A context switch activity may be exercised by hardware circuits, application programs, operating system programs or firmware code (microcode, pico-code or licensed internal code (LIC) alone or in combination.

A processor accesses operands according to instruction defined methods. The instruction may provide an immediate operand using the value of a portion of the instruction, may provide one or more register fields explicitly pointing to either general purpose registers or special purpose registers (floating point registers for example). The instruction may utilize implied registers identified by an opcode field as operands. The instruction may utilize memory locations for operands. A memory location of an operand may be provided by a register, an immediate field, or a combination of registers and immediate field as exemplified by the z/Architecture long displacement facility wherein the instruction defines a base register, an index register and an immediate field (displacement field) that are added together to provide the address of the operand in memory. Location herein implies a location in main memory (main storage) unless otherwise indicated.

Figure 4C:
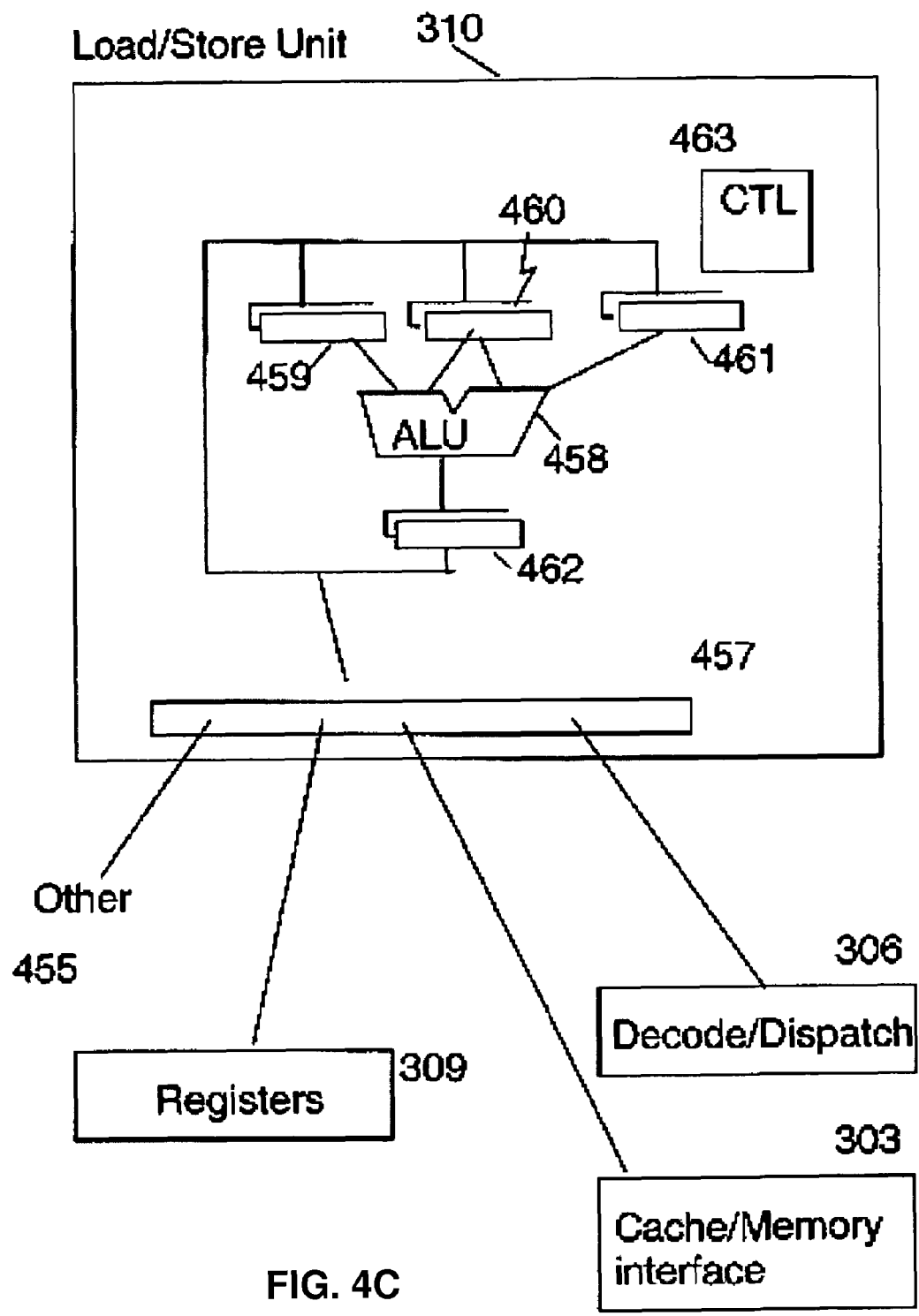

Referring to FIG. 4C, a processor accesses storage using a load/store unit 310. The load/store unit 310 may perform a load operation by obtaining the address of the target operand in memory through the cache/memory interface and loading the operand in an architected register 309 or another memory location, or may perform a store operation by obtaining the address of the target operand in memory and storing data obtained from an architected register 309 or another memory location in the target operand location in memory. The load/store unit 310 may be speculative and may access memory in a sequence that is out-of-order relative to the instruction sequence; however the load/store unit 310 maintains the appearance to programs that instructions were executed in order. A load/store unit 310 may communicate with architected registers 309, decode/dispatch unit 306, cache/memory interface or other elements 455 and comprises various register circuits, ALUs 458 and control logic 463 to calculate storage addresses and to provide pipeline sequencing to keep operations in-order. Some operations may be out of order but the load/store unit provides functionality to make the out of order operations appear to the program as having been performed in order as is well known in the art.

Preferably addresses that an application program "sees" are often referred to as virtual addresses. Virtual addresses are sometimes referred to as "logical addresses" and "effective addresses." These virtual addresses are virtual in that they are redirected to physical memory location by one of a variety of DAT technologies such as the DAT 312 of FIG. 3, including, but not limited to prefixing a virtual address with an offset value, translating the virtual address via one or more translation tables, the translation tables including at least a segment table and a page table alone or in combination, preferably, the segment table having an entry pointing to the page table. In z/Architecture, a hierarchy of translations is provided including a region first table, a region second table, a region third table, a segment table and an optional page table. The performance of the address translation is often improved by utilizing a translation look-aside buffer (TLB) which comprises entries mapping a virtual address to an associated physical memory location. The entries are created when DAT 312 translates a virtual address using the translation tables. Subsequent use of the virtual address can then utilize the entry of the fast TLB rather than the slow sequential translation table accesses. The TLB content may be managed by a variety of replacement algorithms including least recently used (LRU).

In the case where the processor 106 is a processor of a multi-processor system, each processor has responsibility to keep shared resources such as I/O, caches, TLBs and memory interlocked for coherency. In an embodiment, "snoop" technologies will be utilized in maintaining cache coherency. In a snoop environment, each cache line may be marked as being in any one of a shared state, an exclusive state, a changed state, an invalid state and the like in order to facilitate sharing.

The I/O units 304 of FIG. 3 provide the processor 106 with means for attaching to peripheral devices including tape, disc, printers, displays, and networks for example. The I/O units 304 are often presented to the computer program by software drivers. In mainframes such as the System z from IBM, channel adapters and open system adapters are I/O units of the mainframe that provide the communications between the operating system and peripheral devices.

Figure 5:
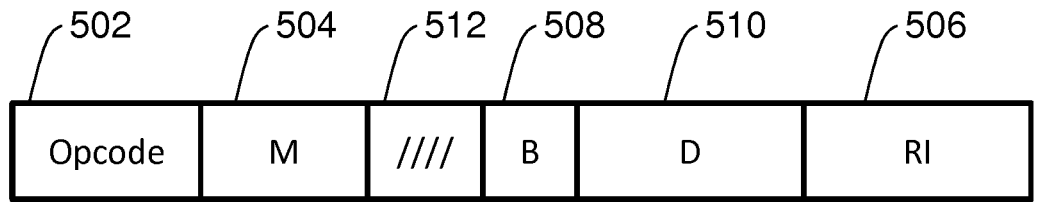
FIG. 5 depicts an instruction format for a branch prediction preload instruction in accordance with an embodiment.
Figure 6:
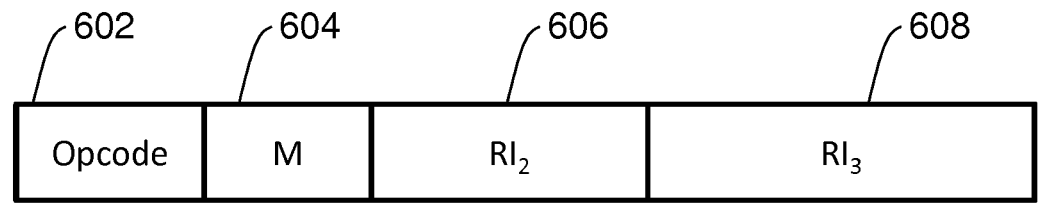
FIG. 6 depicts another instruction format for a branch prediction preload instruction in accordance with an embodiment.

FIGS. 5 and 6 depict example instruction formats 500 and 600 for branch prediction preload instructions. Instruction format 500 is a branch prediction preload instruction including an opcode 502, a mask field 504, a starting address offset RI 506, a target address base register 508, and a target address displacement 510. The instruction format 500 may also include reserved/undefined bits 512. Similarly, instruction format 600 is a branch prediction relative preload instruction including an opcode 602, a mask field 604, a starting address offset $RI_2$ 606, and a target address offset $RI_3$ 608. The opcodes 502 and 602 can be selected so as to uniquely identify the instruction formats 500 and 600 relative to other architected instructions.

The starting address offset RI 506 or the starting address offset RI$_2$ 606 is used to determine a starting address of a predicted branch instruction. In an exemplary embodiment, the starting address offset RI 506 and the starting address offset RI$_2$ 606 are signed binary integers specifying the number of halfwords that are added to the address of the current branch preload instruction to generate the address of a branch, or execute-type instruction. In one example, the starting address offset RI 506 of instruction format 500 contains a signed 16-bit integer, and the starting address offset RI$_2$ 606 of instruction format 600 contains a signed 12-bit integer. When adding the number of halfwords specified in the starting address offset RI 506 or the starting address offset RI$_2$ 606 to the address of the current branch preload instruction, the result is subject to the current addressing mode. That is, the result is treated as a 24-bit address in the 24-bit addressing mode, a 31-bit address in the 31-bit addressing mode, or a 64-bit address in the 64-bit addressing mode.

Subject to the controls in the mask field 504 or the mask field 604, the processor 106 is provided with information about a branch or execute-type instruction designated by the starting address offset RI 506 or starting address offset RI$_2$ 606. The predicted target address of the designated instruction is specified by the target address base register 508 in combination with the target address displacement 510 or the target address offset RI$_3$ 608.

In exemplary embodiments, the mask fields 504 and 604 each contain a 4-bit unsigned binary integer that is used as a code to signal CPU attributes of the branch instruction designated by the starting address offset. An example of the codes for the mask fields 504 and 604 are as follows:

Code 0—The instruction is a branch instruction that is 4 bytes in length. The branch instruction is not used for calling linkage or a returning linkage and there may be multiple potential targets of this branch instruction.

Codes 1-4—Reserved.

Code 5—The instruction is a branch instruction that is 2 bytes in length. The branch instruction is used for calling linkage, and there is only one target of this branch instruction.

Code 6—The instruction is a branch instruction that is 2 bytes in length. The branch instruction is used for returning linkage.

Code 7—The instruction is a branch instruction that is 2 bytes in length. The branch instruction is used for calling linkage, and there may be multiple potential targets of this branch instruction.

Code 8—The instruction is a branch instruction that is 4 bytes in length. The branch instruction is not used for calling linkage or returning linkage, and there is only one target of this branch instruction.

Code 9—The instruction is a branch instruction that is 4 bytes in length. The branch instruction is used for calling linkage, and there is only one target of the branch instruction.

Code 10—The instruction is a branch instruction that is 4 bytes in length. The branch instruction may be used for returning linkage and unconditional branches.

Code 11—The instruction is a branch instruction that is 4 bytes in length. The branch instruction is used for calling linkage, and there may be multiple potential targets of this branch instruction.

Code 12—The instruction is a branch instruction that is 6 bytes in length. The branch instruction is not used for calling linkage or returning linkage, and there is only one target of this branch instruction.

Code 13—The instruction is a branch instruction that is 6 bytes in length. The branch instruction is used for calling linkage, and there is only one target of this branch instruction.

Code 14—The instruction is an execute-type instruction, e.g., EXECUTE. The execute-type instruction may temporarily branch to execute an instruction, which it is allowed to modify, and then immediately return given this single instruction is not a taken branch which redirects the code stream elsewhere.

Code 15—The instruction is an execute-type instruction, e.g., EXECUTE RELATIVE LONG. The execute-type instruction may temporarily branch to execute an instruction, which it is allowed to modify, and then immediately return given this single instruction is not a taken branch which redirects the code stream elsewhere.

For instruction format 500, when the mask field 504 specifies a branch instruction, the target address formed by the target address base register 508 in combination with the target address displacement 510 is a predicted branch-target address of the branch instruction designated by the starting address offset RI 506. For instruction format 500, when the mask field 504 specifies an execute-type instruction, the target address formed by the target address base register 508 in combination with the target address displacement 510 is an execute-target address of the execute-type instruction designated by the starting address offset RI 506 subject to the current addressing mode. That is, the result is treated as a 24-bit address in the 24-bit addressing mode, a 31-bit address in the 31-bit addressing mode, or a 64-bit address in the 64-bit addressing mode.

For instruction format 600, when the mask field 604 specifies a branch instruction, the contents of the target address offset RI$_3$ 608 are a 24-bit signed binary integer specifying the number of halfwords that is added to the address of the branch prediction relative preload instruction to generate the branch-target address of the branch instruction designated by the starting address offset RI$_2$ 606. For instruction format 600, when the mask field 604 specifies an execute-type instruction, the contents of the target address offset RI$_3$ 608 are a 24-bit signed binary integer specifying the number of halfwords that is added to the address of the branch prediction relative preload instruction to generate the execute-target address of the execute-type instruction designated by the starting address offset RI$_2$ 606. When adding the number of halfwords specified by the target address offset RI$_3$ 608 to the address of the branch prediction relative preload instruction, the result is subject to the current addressing mode. That is, the result is treated as a 24-bit address in the 24-bit addressing mode, a 31-bit address in the 31-bit addressing mode, or a 64-bit address in the 64-bit addressing mode.

Depending on the model, the processor 106 may not implement all of the branch-attribute codes listed above. For codes that are not recognized by the processor 106, and for reserved codes, the instruction may act as a no-operation. In exemplary embodiments, the branch/execute-type addresses and target addresses specified by the instruction formats 500 and 600 are virtual addresses.

Figure 7:
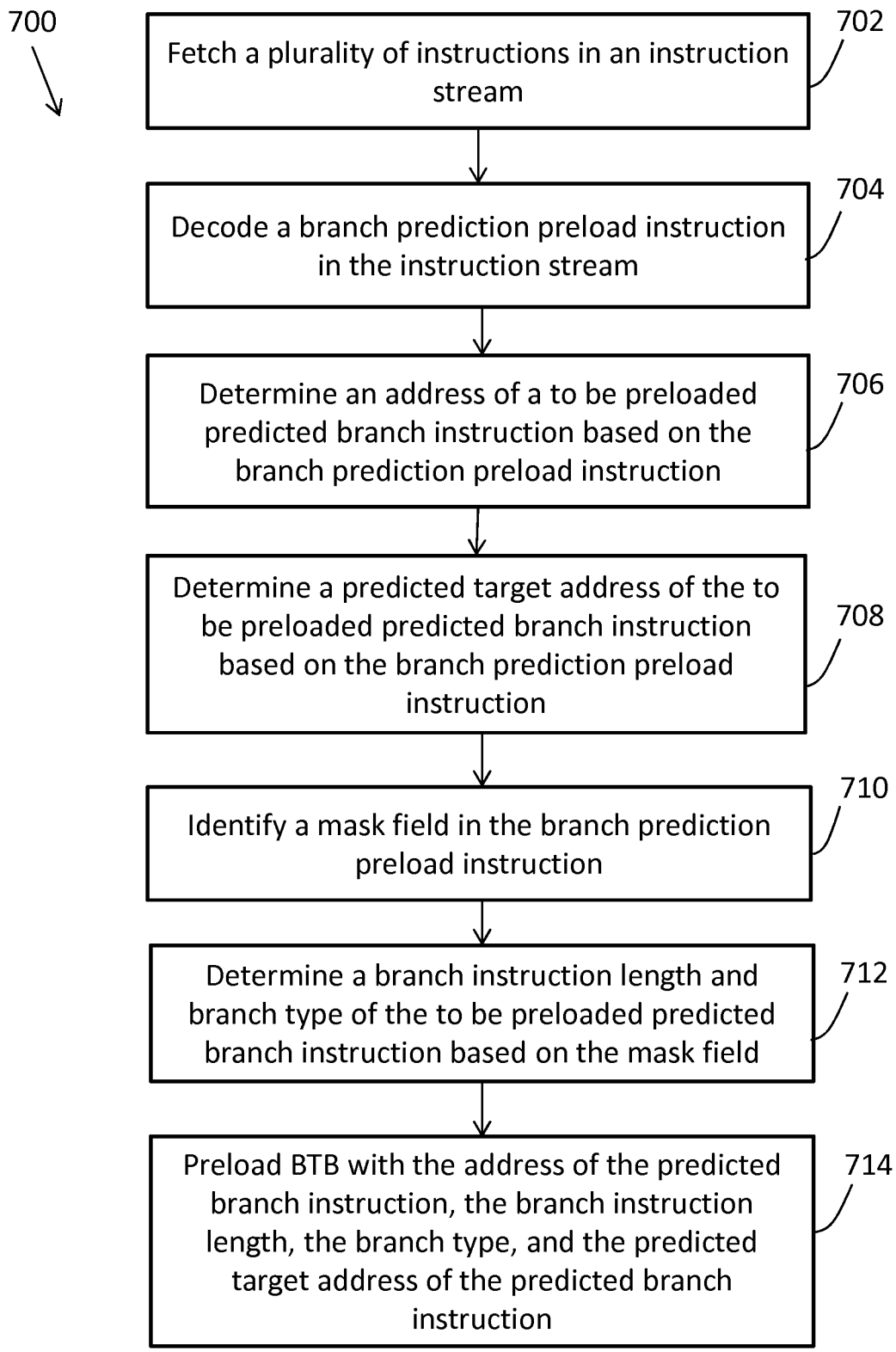
FIG. 7 depicts a process flow for branch prediction preloading in accordance with an embodiment.

FIG. 7 depicts an example process 700 for branch prediction preloading that can be implemented in processor 106. At block 702, a plurality of instructions in an instruction stream are fetched, where the instruction stream is a sequence of instructions that may be executed. Instructions can be fetched from an instruction cache in caches 303 using instruction fetch unit 305. At block 704, a branch prediction preload instruction is decoded in the instruction stream. Instruction decoding may be performed by decode/dispatch unit 306.

At block 706, an address of a to be preloaded predicted branch instruction is determined based on the branch prediction preload instruction. The branch prediction preload instruction can be in instruction format 500, instruction format 600, or a variation thereof. The address of the to be preloaded predicted branch instruction may be an address offset from the address of the branch prediction preload instruction. For instruction format 500, the address can be a starting address based on the starting address offset RI 506. For instruction format 600, the address can be a starting address based on the starting address offset $RI_2$ 606. Alternative formats may use an ending address rather than a starting address as the address. For example, offsets RI 506 and $RI_2$ 606 can be implemented as ending address offsets rather than starting address offsets. As a further alternative, the address can be an ending address based on the starting address offset RI 506 or the starting address offset $RI_2$ 606, plus a branch instruction length per the mask fields 504 and 604, minus one or more addressable units (e.g., bytes) to align the address.

At block 708, a predicted target address of the to be preloaded predicted branch instruction is determined based on the branch prediction preload instruction. For instruction format 500, the predicted target address can be determined based on the contents of the target address base register 508 in combination with the target address displacement 510. For instruction format 600, the predicted target address can be determined based on the target address offset $RI_3$ 608.

At block 710, a mask field is identified in the branch prediction preload instruction. In exemplary embodiments, decodes of the mask field 504 of instruction format 500 and mask field 604 of instruction format 600 are substantially the same. The mask fields 504 and 604 define branch instruction length and branch type for preloading the BTB 432. At block 712, a branch instruction length of the to be preloaded predicted branch instruction is determined based on the mask field. A branch type of the to be preloaded predicted branch instruction can also be determined based on the mask field and may be provided to the BTB 432. At block 714, based on executing the branch prediction preload instruction, the BTB 432 is preloaded with the address of the predicted branch instruction, the branch instruction length, the branch type, and the predicted target address associated with the predicted branch instruction. Where the address of the predicted branch instruction may be determined based on the branch offset being added to the address of the branch preload instruction. The address of the predicted branch instruction may represent a starting address or an ending address. By knowing the end address as a function of the supplied instruction length, which can also be stored in the BTB 432, it is known how far sequential fetching must proceed for a variable instruction length architecture upon future prediction of the preloaded branch being predicted taken by the BTB 432.

Preloading the BTB 432 with the address of the predicted branch instruction and the predicted target address associated with the predicted branch instruction may store a portion of the address of the predicted branch instruction and a portion of the predicted target address to the BTB 432. For example, address tags stored in the BTB 432 may include fewer bits than a complete address, but complete addresses can be determined based on the address tags in combination with other information, e.g., a base address or address range.

Various actions can be taken based on the branch type. For example, based on determining that the branch type of the predicted branch instruction is a call branch, a sequential address, as a function of the branch instruction length, is saved for a future prediction of a return branch. The sequential address can be saved to a call-return stack in memory 105 or another area of memory upon prediction of the predicted branch instruction from the BTB 432. Based on determining that the branch type of the predicted branch instruction is the return branch, the sequential address can be retrieved upon prediction as a target prediction from the call-return stack instead of from a target address entry in the BTB 432. An indication that a branch type is a call type or return type branch is saved along with the branch in the BTB 432. Upon prediction of the call type, the sequential address, as a function of the branch instruction length also stored in the BTB 432, is saved into the referenced stack. Upon prediction of the branch being referenced as a return, the stack is referenced for the return address.

Based on determining that the branch type of the predicted branch instruction is an address mode changing branch, an addressing mode is set corresponding to the branch type upon prediction of the predicted target address in the branch target buffer. Based on determining that the branch type of the predicted branch instruction is an execute instruction type, the execute instruction type is handled as a special branch type in branch prediction logic of the branch prediction unit 308. For example, a single execute instruction can effectively result in two sequential branches for branching to an instruction to execute and immediately returning after instruction execution.

Additional information based on the branch type can also be stored in the BTB 432. For example, if the branch has multiple targets as denoted by the mask field 504, 604, a multi-target indicator may also be saved in the BTB 432 such that appropriate prediction structures may be applied when the branch is predicted and the target is hence also predicted.

As will be appreciated by one skilled in the art, one or more aspects of the present invention may be embodied as a system, method or computer program product. Accordingly, one or more aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, one or more aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 8:
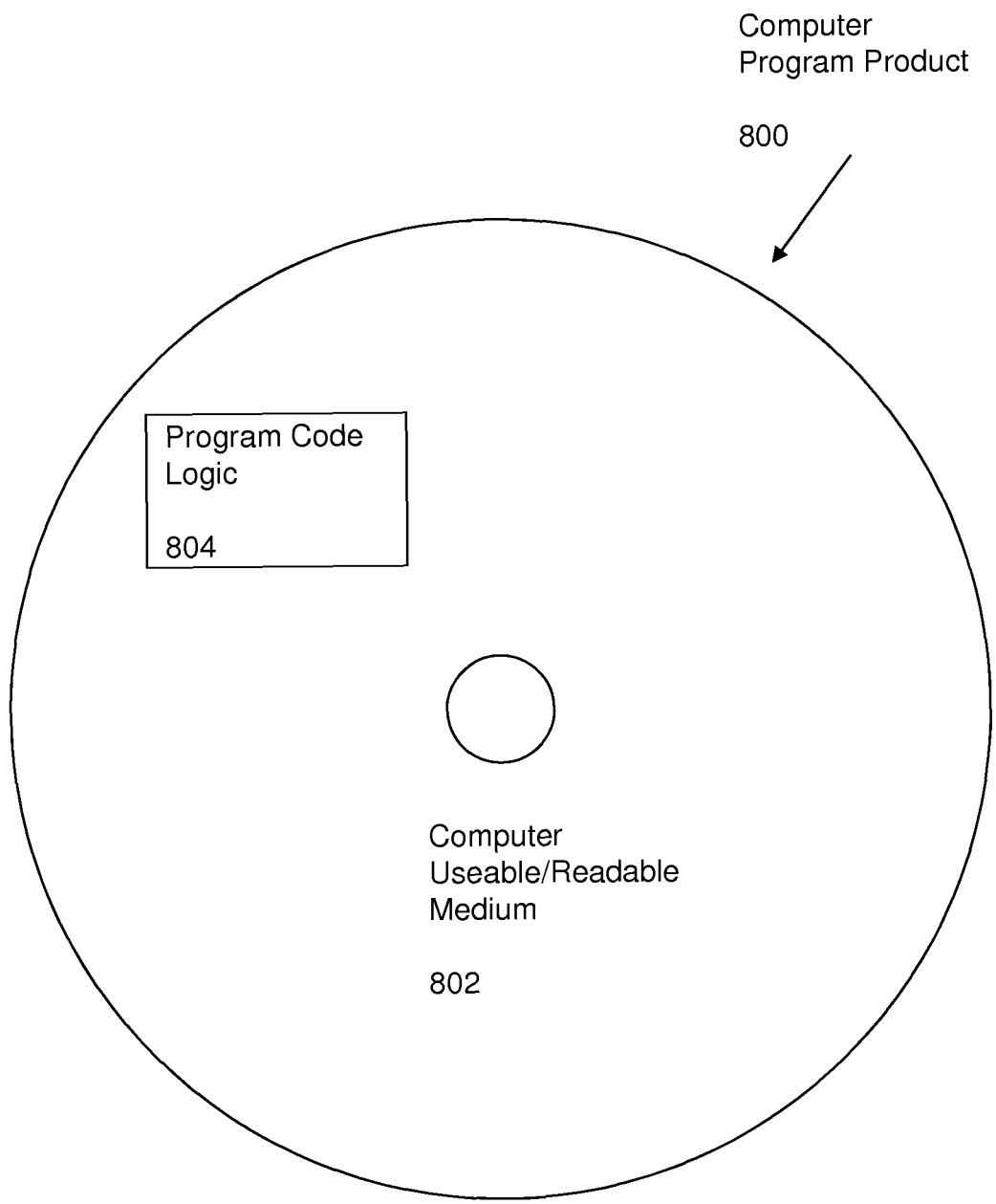
FIG. 8 illustrates a computer program product in accordance with an embodiment.

Referring now to FIG. 8, in one example, a computer program product 800 includes, for instance, one or more storage media 802, wherein the media may be tangible and/or non-transitory, to store computer readable program code means or logic 804 thereon to provide and facilitate one or more aspects of embodiments described herein.

Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit. Such program code may be created using a compiler or assembler for example, to assemble instructions, that, when executed perform aspects of the invention.

Embodiments include a system, method, and computer program product for branch prediction preloading. The system for branch prediction preloading includes an instruction cache and branch target buffer coupled to a processing circuit. The processing circuit is configured to perform a method. The method includes fetching a plurality of instructions in an instruction stream from the instruction cache, and decoding a branch prediction preload instruction in the instruction stream. The method further includes determining, by the processing circuit, an address of a predicted branch instruction based on the branch prediction preload instruction, and determining, by the processing circuit, a predicted target address of the predicted branch instruction based on the branch prediction preload instruction. The method also includes identifying a mask field in the branch prediction preload instruction, and determining, by the processing circuit, a branch instruction length of the predicted branch instruction based on the mask field. Based on executing the branch prediction preload instruction, the branch target buffer is preloaded with the address of the predicted branch instruction, the branch instruction length, and the predicted target address associated with the predicted branch instruction.

In an embodiment, the processing circuit of the system is further configured to determine a branch type of the predicted branch instruction based on the mask field, and provide the branch type of the predicted branch instruction to the branch target buffer. In an embodiment, the processing circuit of the system is further configured to save a sequential address for a future prediction of a return branch upon prediction of the predicted branch instruction from the branch target buffer based on determining that the branch type of the predicted branch instruction is a call branch. In an embodiment, the sequential address is saved to a call-return stack, and based on determining that the branch type of the predicted branch instruction is the return branch, the sequential address is retrieved as a target prediction from the call-return stack upon prediction instead of from a target address entry in the branch target buffer. In an embodiment, based on determining that the branch type of the predicted branch instruction is an address mode changing branch, an addressing mode is set corresponding to the branch type upon prediction of the predicted target address in the branch target buffer. In an embodiment, based on determining that the branch type of the predicted branch instruction is an execute instruction type, the execute instruction type is handled as a special branch type in branch prediction logic.

In an embodiment, the processing circuit of the system is further configured to determine the address of the predicted branch instruction as an address offset from the branch prediction preload instruction, and determine the predicted target address as one of: a relative offset from the branch prediction preload instruction and a displacement from a base value. The address of the predicted branch instruction may be one of: a starting address and an ending address of the predicted branch instruction. In an embodiment, the processing circuit of the system is further configured to preload the branch target buffer with the address of the predicted branch instruction and the predicted target address associated with the predicted branch instruction stores a portion of the address of the predicted branch instruction and a portion of the predicted target address to the branch target buffer.

Technical effects and benefits include preloading branch predictions into a branch target buffer. Defining instruction length of a branch or execute type instruction in a branch prediction preload instruction enables support for accurately predicting variable length instructions. Defining the type of branch or execute type instruction as part of the branch prediction preload instruction allows additional type specific efficiencies to be realized as part of the prediction and prefetching process.

The terminology used herein is for the purpose of describing particular embodiments only and is not intended to be limiting of embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments have been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiments were chosen and described in order to best explain the principles and the practical application, and to enable others of ordinary skill in the art to understand the embodiments with various modifications as are suited to the particular use contemplated.

Computer program code for carrying out operations for aspects of the embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments are described above with reference to flowchart illustrations and/or schematic diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system for branch prediction preloading, the system comprising:
   an instruction cache;
   a branch target buffer; and
   a processing circuit coupled to the instruction cache and the branch target buffer, the processing circuit configured to perform a method comprising:
      fetching a plurality of instructions in an instruction stream from the instruction cache;
      decoding a branch prediction preload instruction in the instruction stream;
      determining, by the processing circuit, an address of a predicted branch instruction based on the branch prediction preload instruction;
      determining, by the processing circuit, a predicted target address of the predicted branch instruction based on the branch prediction preload instruction;
      identifying a mask field in the branch prediction preload instruction;
      determining, by the processing circuit, a branch instruction length of the predicted branch instruction based on the mask field; and
      based on executing the branch prediction preload instruction, preloading the branch target buffer with the address of the predicted branch instruction, the branch instruction length, and the predicted target address associated with the predicted branch instruction.

2. The system of claim 1, further comprising:
   determining, by the processing circuit, a branch type of the predicted branch instruction based on the mask field; and
   providing the branch type of the predicted branch instruction to the branch target buffer.

3. The system of claim 2, further comprising:
   based on determining that the branch type of the predicted branch instruction is a call branch, saving a sequential address for a future prediction of a return branch upon prediction of the predicted branch instruction from the branch target buffer.

4. The system of claim 3, wherein saving the sequential address is to a call-return stack, and further comprising:
   based on determining that the branch type of the predicted branch instruction is the return branch, retrieving the sequential address as a target prediction from the call-return stack upon prediction instead of from a target address entry in the branch target buffer.

5. The system of claim 2, further comprising:
   based on determining that the branch type of the predicted branch instruction is an address mode changing branch, setting an addressing mode corresponding to the branch type upon prediction of the predicted target address in the branch target buffer.

6. The system of claim 2, further comprising:
   based on determining that the branch type of the predicted branch instruction is an execute instruction type, handling the execute instruction type as a special branch type in branch prediction logic.

7. The system of claim 1, further comprising:
   determining the address of the predicted branch instruction as an address offset from the branch prediction preload instruction; and
   determining the predicted target address as one of: a relative offset from the branch prediction preload instruction and a displacement from a base value.

8. The system of claim 7, wherein the address of the predicted branch instruction is one of: a starting address and an ending address of the predicted branch instruction; and
   preloading the branch target buffer with the address of the predicted branch instruction and the predicted target address associated with the predicted branch instruction stores a portion of the address of the predicted branch instruction and a portion of the predicted target address to the branch target buffer.

9. A computer program product for branch prediction preloading, the computer program product comprising:
   a tangible storage medium readable by a processing circuit and storing instructions for execution by the processing circuit for performing a method comprising:
      fetching a plurality of instructions in an instruction stream;
      decoding a branch prediction preload instruction in the instruction stream;
      determining, by the processing circuit, an address of a predicted branch instruction based on the branch prediction preload instruction;
      determining, by the processing circuit, a predicted target address of the predicted branch instruction based on the branch prediction preload instruction;

identifying a mask field in the branch prediction preload instruction;

determining, by the processing circuit, a branch instruction length of the predicted branch instruction based on the mask field; and based on executing the branch prediction preload instruction, preloading a branch target buffer with the address of the predicted branch instruction, the branch instruction length, and the predicted target address associated with the predicted branch instruction.

10. The computer program product of claim 9, further comprising:

determining, by the processing circuit, a branch type of the predicted branch instruction based on the mask field; and providing the branch type of the predicted branch instruction to the branch target buffer.

11. The computer program product of claim 10, further comprising:

based on determining that the branch type of the predicted branch instruction is a call branch, saving a sequential address to a call-return stack for a future prediction of a return branch upon prediction of the predicted branch instruction from the branch target buffer; and based on determining that the branch type of the predicted branch instruction is the return branch, retrieving the sequential address as a target prediction from the call-return stack upon prediction instead of from a target address entry in the branch target buffer.

12. The computer program product of claim 10, further comprising:

based on determining that the branch type of the predicted branch instruction is an address mode changing branch, setting an addressing mode corresponding to the branch type upon prediction of the predicted target address in the branch target buffer; and based on determining that the branch type of the predicted branch instruction is an execute instruction type, handling the execute instruction type as a special branch type in branch prediction logic.

13. The computer program product of claim 9, further comprising:

determining the address of the predicted branch instruction as an address offset from the branch prediction preload instruction; and determining the predicted target address as one of: a relative offset from the branch prediction preload instruction and a displacement from a base value.

14. The computer program product of claim 13, wherein the address of the predicted branch instruction is one of: a starting address and an ending address of the predicted branch instruction; and preloading the branch target buffer with the address of the predicted branch instruction and the predicted target address associated with the predicted branch instruction stores a portion of the address of the predicted branch instruction and a portion of the predicted target address to the branch target buffer.

* * * * *